US 9,909,605 B2

(12) United States Patent
Baker et al.

(10) Patent No.: US 9,909,605 B2
(45) Date of Patent: Mar. 6, 2018

(54) HYBRID JOINT MANUFACTURING

(71) Applicant: BAE SYSTEMS plc, London (GB)

(72) Inventors: David Baker, Bristol (GB); Amir Rezai, Bristol (GB); Andrew David Wescott, Bristol (GB); Daniel Peter Graham, Guilford (GB)

(73) Assignee: BAE SYSTEMS plc, London (GB)

( * ) Notice: Subject to any disclaimer, the term of this patent is extended or adjusted under 35 U.S.C. 154(b) by 457 days.

(21) Appl. No.: 14/437,402

(22) PCT Filed: Oct. 21, 2013

(86) PCT No.: PCT/GB2013/052744
§ 371 (c)(1),
(2) Date: Apr. 21, 2015

(87) PCT Pub. No.: WO2014/064430
PCT Pub. Date: May 1, 2014

(65) Prior Publication Data
US 2015/0260208 A1 Sep. 17, 2015

(30) Foreign Application Priority Data

Oct. 22, 2012 (EP) .................................. 12275159
Oct. 22, 2012 (GB) ................................. 1218957.7

(51) Int. Cl.
*F16B 5/00* (2006.01)
*F16B 5/04* (2006.01)
(Continued)

(52) U.S. Cl.
CPC .............. *F16B 5/045* (2013.01); *B21J 15/00* (2013.01); *B21J 15/02* (2013.01); *B21J 15/147* (2013.01);
(Continued)

(58) Field of Classification Search
CPC .... F16B 5/045; F16B 5/07; F16B 5/12; F16B 5/126; B29C 66/70; B29C 66/712;
(Continued)

(56) References Cited
U.S. PATENT DOCUMENTS 3,415,555 A * 12/1968 Haller .................... B21K 25/00
403/276
4,281,446 A * 8/1981 Umeno ................... B23P 11/00
29/432.1
(Continued)

FOREIGN PATENT DOCUMENTS

DE 102009017776 A1 10/2010
DE 102009047671 A1 6/2011
(Continued)

OTHER PUBLICATIONS

International Preliminary Report on Patentability and Written Opinion received for PCT Application No. PCT/GB2013/052744, dated May 7, 2015. 7 pages.
(Continued)

*Primary Examiner* — Jonathan Masinick
(74) *Attorney, Agent, or Firm* — Finch & Maloney PLLC

(57) ABSTRACT

A method for forming a joint between a fiber reinforced composite component and a metallic component and a joint are provided. The metallic component and the composite component each define a joint surface for mating with the joint surface of the other to join the two components together and the composite component defines a free surface opposed to the joint surface thereof. The joint surface of the metallic component defines an array of pins extending therefrom with each pin defining a pin head at an end distal from the joint surface. The method includes the steps of pressing together the joint surfaces of the two components whereby to cause the array of pins to penetrate through the fiber reinforcing material, and modifying the effective cross sec- (Continued)

tional shape of the pin heads whereby to increase the constraint applied to the composite component against peeling of the composite component from the joint surface of the metallic component.

20 Claims, 6 Drawing Sheets

(51) Int. Cl.
    *B29C 65/00*     (2006.01)
    *B21J 15/02*     (2006.01)
    *B29C 65/64*     (2006.01)
    *B21K 25/00*     (2006.01)
    *B21J 15/00*     (2006.01)
    *B21J 15/14*     (2006.01)
    *F16B 17/00*     (2006.01)
    *B29C 65/56*     (2006.01)
    *B29C 65/60*     (2006.01)

(52) U.S. Cl.
    CPC .............. *B21K 25/00* (2013.01); *B29C 65/64* (2013.01); *B29C 66/1122* (2013.01); *B29C 66/21* (2013.01); *B29C 66/43* (2013.01); *B29C 66/721* (2013.01); *B29C 66/72141* (2013.01); *B29C 66/742* (2013.01); *B29C 66/81429* (2013.01); *B29C 66/81431* (2013.01); *B29C 66/8322* (2013.01); *B29C 66/8432* (2013.01); *F16B 17/008* (2013.01); *B29C 65/567* (2013.01); *B29C 65/606* (2013.01); *B29C 65/607* (2013.01); *B29C 66/81419* (2013.01); *B29C 66/81423* (2013.01); *Y10T 29/49938* (2015.01); *Y10T 403/4966* (2015.01)

(58) Field of Classification Search
    CPC ....... B29C 66/742; B29C 65/562; B32B 3/06; B29L 2031/3076
    See application file for complete search history.

(56) References Cited

U.S. PATENT DOCUMENTS

| | | | | |
|---|---|---|---|---|
| 5,086,997 | A * | 2/1992 | Glass | B29C 65/606 |
| | | | | 244/123.3 |
| 6,824,324 | B2 * | 11/2004 | Hardt | F16C 11/04 |
| | | | | 29/525.06 |
| 7,117,578 | B2 | 10/2006 | Schnell | |
| 7,347,641 | B2 * | 3/2008 | Prichard | B21J 15/02 |
| | | | | 29/524.1 |
| 7,802,799 | B1 | 9/2010 | Semmes | |
| 9,068,584 | B2 * | 6/2015 | McDowell | F16B 19/008 |
| 2006/0236652 | A1 * | 10/2006 | Kismarton | B29C 65/562 |
| | | | | 52/782.1 |
| 2008/0003401 | A1 | 1/2008 | Barnes et al. | |
| 2009/0302602 | A1 * | 12/2009 | Larsson | B29B 13/025 |
| | | | | 285/382 |
| 2012/0210558 | A1 * | 8/2012 | Logan | B23P 11/005 |
| | | | | 29/527.5 |
| 2013/0239398 | A1 * | 9/2013 | Bense | F16B 39/00 |
| | | | | 29/525.02 |
| 2016/0297138 | A1 * | 10/2016 | De Traglia Amancio Filho | B29C 65/08 |

FOREIGN PATENT DOCUMENTS

| | | |
|---|---|---|
| EP | 2302166 A2 | 3/2011 |
| WO | 2008110835 A1 | 9/2008 |
| WO | 2014064430 A1 | 5/2014 |

OTHER PUBLICATIONS

International Search Report and Written Opinion received for PCT Application No. PCT/GB2013/052744, dated Jan. 29, 2014. 10 pages.
Extended European Search Report received for EP 12275159.7, dated Mar. 13, 2015. 4 pages.
GB Intellectual Property Office Search Report under Section 17(5) received for GB Patent Application No. 1218957.7 dated Feb. 21, 2013. 4 pages.

* cited by examiner

HYBRID JOINT MANUFACTURING

The invention relates to the manufacture of hybrid joints more particularly to the manufacture of joints between parts made of differing materials and most particularly to the manufacture of joints between metal and composite parts.

Hybrid joining may be defined as 'a method that makes use of multiple joining techniques such as mechanical interlocking and adhesive bonding'. Hybrid joints are able to offer improvements in a range of mechanical properties including, but not limited to, ultimate strength, durability and damage tolerance.

Adhesive joints are renowned for having poor performance in 'peel' loading conditions. Hybrid joints having simple cylindrical projections anchored on a first component and extending through a second are well suited to shear loading. However, the projections may only moderately improve 'peel' loading performance if they 'pull-out' of the second component, for example a fibre reinforced composite component, too easily during failure. Such projections are routinely called pins and thus the term "pin" will be used from now on. However, wherever a pin is referred to, it should be understood that any suitable form of projection may be used which may or may not take the form of a classical cylindrical pin.

Aircraft and defence platforms now regularly use composite materials instead of metals due to their high stiffness and strength, low weight, resistance to corrosion and potentially lower fabrication costs. Despite this, metals are still required for high tolerance surfaces, fire resistance, for high volume manufacture and low cost assembly.

By combining composites and metals in a single structure, it is possible to gain advantage from each respective material which can lead to a great deal more design flexibility. An example of this would be marine propulsion shafts. Previously manufactured from metals, these may now be formed from lightweight, corrosion resistant composite materials. Metallic end fittings are nevertheless required for bearing interfaces as the composite material does not have the necessary wear resistance or dimensional tolerance.

The main challenge with multi-material structures is how best to join dissimilar materials together. Fastened joints suffer from increased weight due to the necessity to reinforce the composite section in the region of any machining operations, not to mention the additional mass of fasteners. Composites are also particularly sensitive to notches which sever the load bearing fibres, resulting in the performance of the composite being degraded and additional stress concentrations being introduced. Adhesive bonding is a popular alternative, but is sensitive to initial surface preparation, hot/wet environments, impact damage and may require a large bond area. Furthermore, high strength adhesively bonded joints tend to exhibit sudden catastrophic failure.

Hybrid joining has accordingly been considered for connecting composites to metals, combining mechanical interlocking features with adhesive bonding. In a typical embodiment, the joint between a fibre reinforced polymer and a metal component uses metallic pins protruding from the metallic component. The pins are inserted into a composite preform of the fibre reinforced polymer, upon assembly, so as to interlock with the fibre reinforcement of the composite material. Resin is then combined with the fibre preform and co-cured with the metallic component in place to create a supplementary adhesive bond.

The resistance of hybrid joints to peel loads is partly dependant on the geometry of the metallic pins that interlock with the composite material. Variants that use bulbous-headed pins give greater resistance to peel loads. However, these disrupt and damage the composite fabric as it is laid over the pins during the manufacturing process. For low cost, scalable manufacture, it is desirable to have sharp narrow pins which easily breach the composite fibre, but these are less effective at resisting peel loads.

Advanced hybrid joints are most commonly created by surface restructuring of the metallic component to produce surface projections, which usually resemble cylindrical pins. Surface restructuring may be through redistributing the metallic material or by addition of material. Redistribution of material on the surface can be achieved using an electron beam to melt the material and drive the molten pool into a new location on the surface. Addition of material can be done in a number of ways including welding pre-formed pins to the surface, or by using additive layer processes to build up the pins layer by layer.

Our research has shown that spacing an array of surface pins to interlock with gaps in the reinforcing textile of a preform for the fibre reinforced composite, such as may be encountered at the crossover points in plain-woven fabric, minimises fibre disruption. This makes it less likely for the pins to degrade the mechanical performance of the composite component. For the same reason, hybrid joints are usually made with pins having a diameter less than 3 mm. Despite this, it may be reasonable to use pins of a diameter greater than 3 mm for structures incorporating coarse woven composite reinforcement fabric.

Our research has also shown that the spacing of the surface pins may be varied to control stress distribution across the joint.

The array of surface pins can often pull-out of the composite component during failure, especially in the case of simple cylindrical pins. While this pull-out failure mechanism may sometimes be exploited as a method of energy absorption, resisting pull-out can increase the energy required to separate the adherends and thus the increase the damage onset threshold and ultimate strength of the joint.

The proposed invention is a process of modifying the hybrid joint geometry during or after the joining process. The process facilitates the use of low cost pin placement methods and allows the initial use of narrow cylindrical pins that will easily pass through the composite reinforcement fabric. However, after the composite fabric has been engaged on the array of pins, the shape of the pins can be modified such that greater constraint is placed on the composite adherend and thus the joint's performance in peel loading is dramatically improved.

According to a first aspect of the invention there is provided a method of forming a joint between a fibre reinforced composite component and a metallic component, the metallic component and the composite component each defining a joint surface for mating with the joint surface of the other to join the two components together and the composite component defining a free surface opposed to the joint surface thereof, the joint surface of the metallic component defining an array of pins extending therefrom with each pin defining a pin head at an end distal from the joint surface, the method including the steps of pressing together the joint surfaces of the two components whereby to cause the array of pins to penetrate through the fibre reinforcing material, and modifying the effective cross sectional shape of the pin heads whereby to increase the constraint applied to the composite component against peeling of the composite component from the joint surface of the metallic component.

The process of the invention could be executed during or following curing of the composite component. Alternatively, the process of the invention may be applied before curing, in order to apply a constraint, or compressive force, to a dry preform or pre-impregnated (pre-preg) layup. Applying the process before curing facilitates simultaneous co-curing of the joint with the retaining features in place. This will usually result in a more secure joint, owing to the increased constraint applied by the additional adhesive bonding and the more precise dimensional tolerances achievable.

Vacuum Assisted Resin Transfer Moulding (VARTM) of a reinforcing dry fibre preform, or use of a pre-preg system, are the most common methods. However, the use of pre-preg is more challenging as the resin can restrict movement of fibres during pin penetration, which may lead to greater fibre damage.

The process modifies the effective cross sectional shape in the region of the top of each pin in such a way that a constraint is applied to the composite reinforcement fabric through which the pins penetrate. This may be achieved by either adding or forming from the pin an enlarged head to the pin to capture the composite material and constrain its movement axially of the pins, usually known as peeling movement.

A residual compressive stress may be applied to the composite component by the constraint as part of the modification process if this is advantageous for a particular application, for example where delamination is a particular concern.

Heads for the pins may be formed or modified in a number of ways including but not limited to: using a hot or cold press to deform the free ends of the pins, by splitting them, riveting them, crimping them or bending over their free ends.

Where high strength materials are used for the metal component, it may be favourable to have weaker pin tips, for forming purposes. This may be achieved by reducing material in the area of the pin that will be deformed or by selecting a weaker material for this area.

The step of modifying the effective cross sectional shape of the pin heads may comprise attaching retaining means to the pins, the retaining means being shaped to constrain the composite component to prevent withdrawal of the pins therefrom.

The retaining means may take the form of preformed pin caps or a retaining mesh. These may be pressed on and held, either initially or permanently, through interference with the pin head geometry. The pin head geometry may be optimised for interference with the constraining features, such as with an arrowhead-type undercut.

Alternatively, the retaining means may be adhered to the pins, or screwed into place, facilitated by threads on the respective pins and retaining features.

A metallic retainer may be welded to each pin head after penetration through the composite material, either instead of mechanical interference or in addition thereto, if desired.

Where the retaining means comprises a metallic mesh, the method may include forming the pins with pointed pin heads and forcing the pins through the mesh, upon assembly of the metallic component to the composite component, whereby to cause the said interference fit to occur.

The pin heads may be formed as arrowheads and the metallic mesh may be caused to pass into interlocking engagement with the pins behind the arrowheads, upon assembly of the metallic component and composite component together.

The pins may be formed with a hollow to receive the retaining means therein and each retaining means may be formed with at least one protrusion to engage at least one pin in the hollow thereof.

The pins may be formed so as not to fully penetrate the composite component, upon assembly, and the pin heads may be formed with one of an internal and an external taper and the retaining means may be formed with the other of the internal and external taper whereby, upon assembly of the metallic component and composite component together, axial engagement of the pins with the retaining means will occur and the tapers will force one of the pin head and the retaining means to expand radially of the pin and interfere with the composite component.

The retaining means may be formed with an external taper shaped to compress an area of the composite component surrounding an aperture formed therein by passage of the pin therethrough, upon assembly of the metallic component and composite component together.

A retaining feature such as metal mesh may have an additional advantage in that it may be used to provide a conductive path from the metal component to the outside of the composite material. This may be used for damage detection in hybrid joints because the resistance between the mesh and metal component will change as pins in the joint become damaged or broken.

Metal mesh may additionally be used to provide a conductive path or ground plane from the metal component to the outside of the composite, as part of a faraday cage structure. This may be used to mitigate damage from lightning strikes or provide electromagnetic shielding or as part of a structural power/communications network.

The pins may be fitted with temporary shaped pin head attachments to aid assembly of the metallic component to the composite component and the pin head attachments may then be removed after the assembly and prior to fitting the retaining means to the pins.

The invention will now be described by way of example with reference to the accompanying drawings of which:

Figure 23:
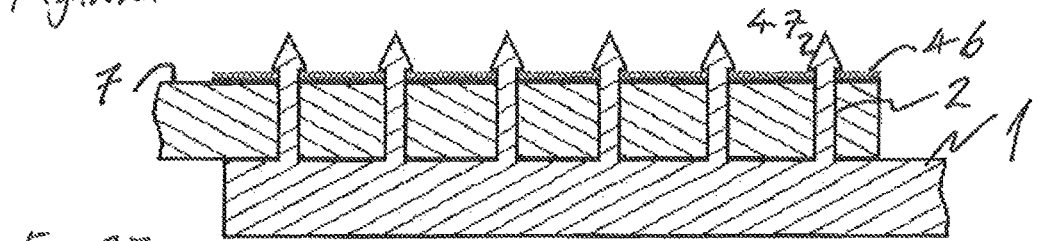
Figure 24:
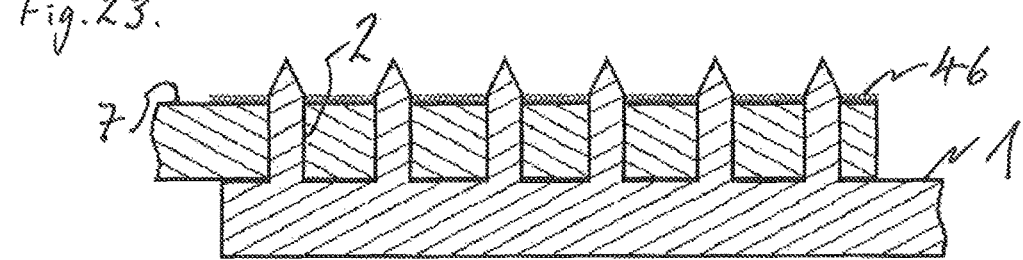
Figure 25:
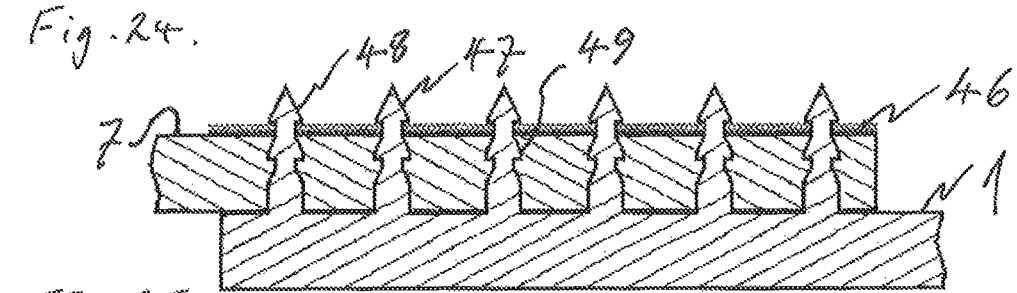
Figure 26:
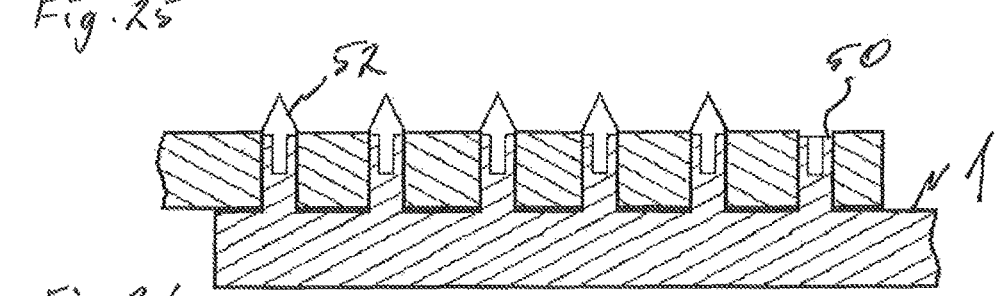
Figure 27:
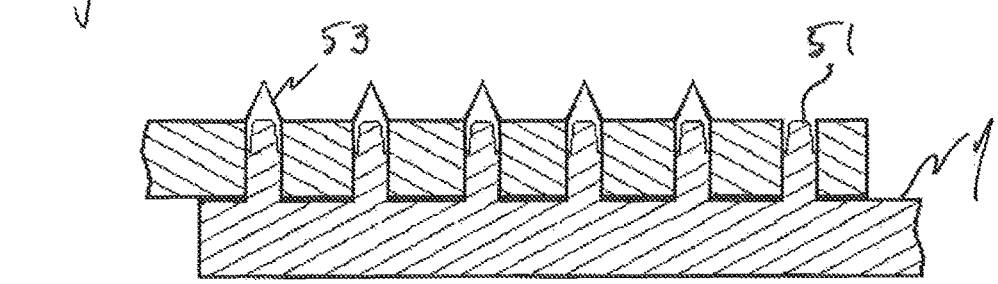

FIGS. 23, 24 and 25 each show, in section, a metallic component joined to a composite component, in accordance with the invention, in which a metal mesh or other form of covering is laid over the composite component, in engagement with pins of alternative form, to form a constraint;

FIGS. 26 and 27 each show, in section, a metallic component joined to a composite component, in accordance with the invention, in which the pins are alternatively shaped to receive temporary or permanent-deformable pin heads of co-operating form, to aid engagement of the composite material onto the pins.

Figure 1:
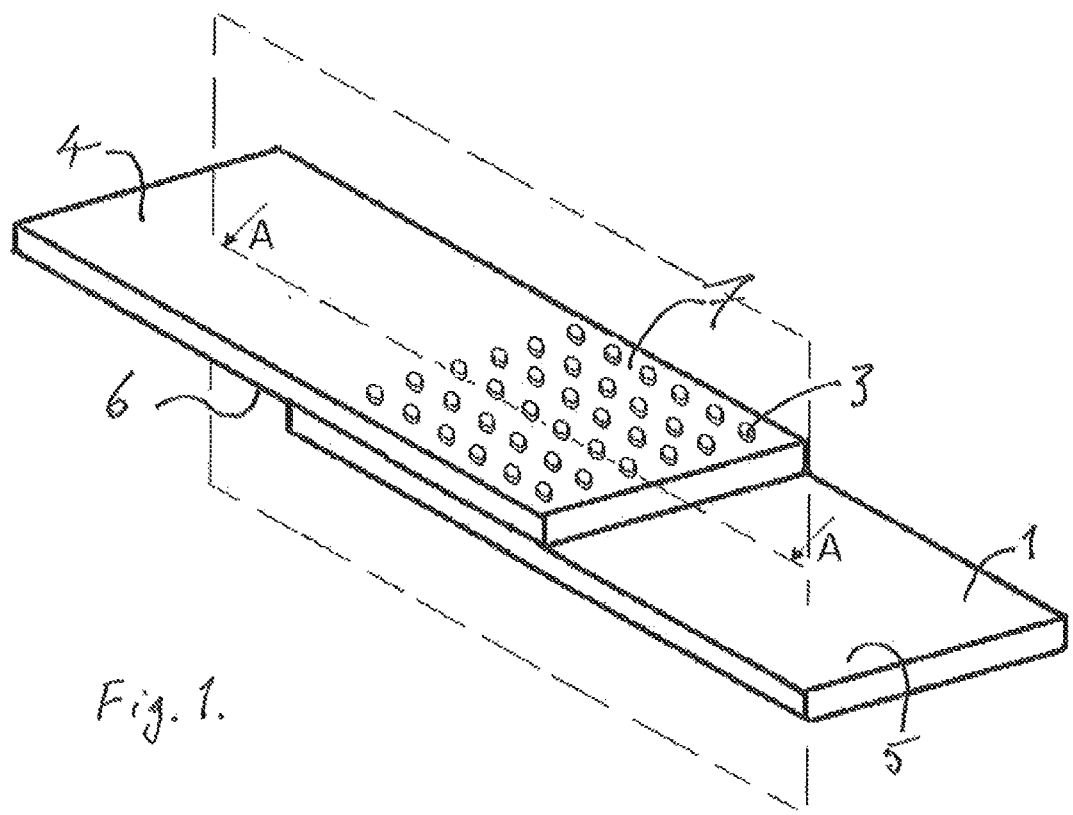
FIG. 1 is a perspective view of a hybrid joint between a metallic component and a fibre reinforced composite component, according to the invention.
Figure 2:
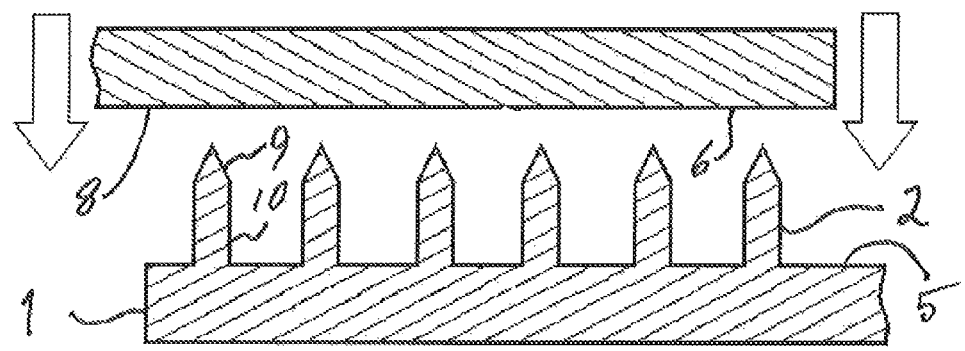
FIGS. 2, 3, 4 and 5 show, in section, an example of how the process of the invention is applied to a composite component and a metallic component to join them together.
Figure 3:
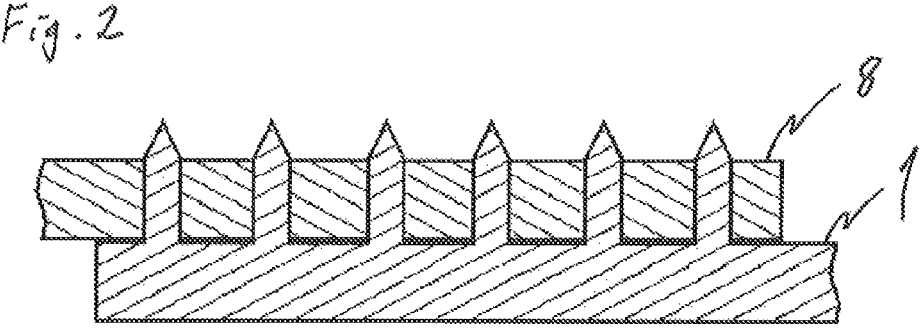
Figure 4:
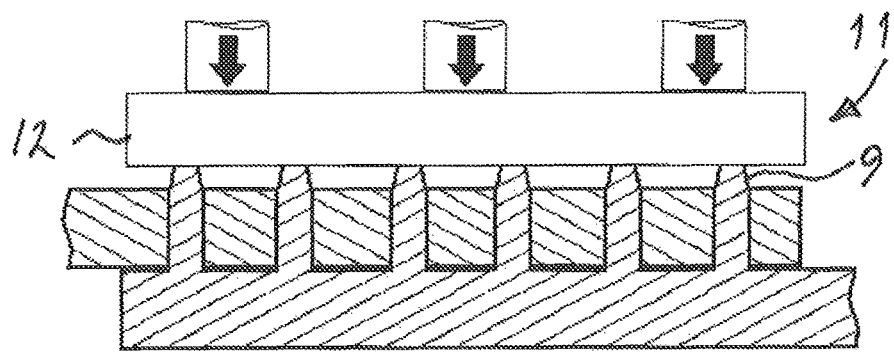

Referring to the drawings, FIG. 1 shows, in a perspective view, a metal/composite hybrid joint. A metallic component 1 has a series of spaced pins 2 (See FIG. 2) each having a constraint in the form of an enlarged pin head 3. A fibre reinforced composite laminate component 4 is joined to the metallic component by adhesion between overlapping parts of surfaces 5, 6 of the components and mechanical interlocking of the pins 2. Peeling of the composite component 4 from the metallic component is restricted if not prevented by the enlarged pin heads 3 bearing down on an upper surface 7 of the composite component.

FIGS. 2 to 5 show how the process of the invention is operated to join together a metallic component 1 and a layup 8 for a composite component. The layup 8, here, is in the form of a "pre-preg", meaning that the layup has already been impregnated with a polymer resin matrix material (not shown separately). However, the layup could equally well be in the form of a fibre preform which has not yet been impregnated with matrix material. The metal component 1 defines a joint surface 5 which itself defines an array of cylindrical pins 2 having conical heads 9. The conical heads 9 have a cross sectional area, measured in a direction parallel to the joint surface 5, which is no greater than that of stems 10 of the pins. The layup 8 defines its own joint surface 6 for engagement with the joint surface 5 of the metal component 1. For joint assembly, pressure is applied to the layup 8, in the direction of the arrows, so that the pins 2 pierce the layup 8 and pass through it. The cross sectional area and head shape of the pins 2 enable them easily to pass between fibres of the layup 8, whether the fibres are woven or non-woven.

Figure 5:
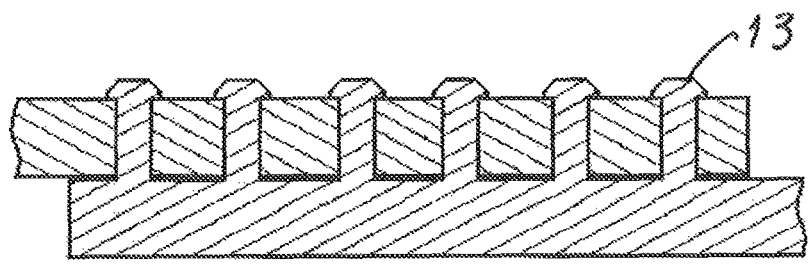

Once the layup has been pressed into position, with the joint surfaces 5 and 6 in contact, a press 11 having a forming tool 12 is lowered onto the pin heads 9 to deform them into the shape 13 shown, in FIG. 5. Deformed pin heads 13 can be seen to have an enlarged cross sectional area which is greater than that of the stems 10. The pin heads 13 thus constrain the layup 8, preventing any movement of the layup axially of the pins, in particular peeling movement, from occurring. The pin heads 13 can be deformed whereby merely to contact an upper surface 7 of the layup 8. Alternatively, they can be further deformed so as to maintain the fibres of the layup in compression, if dictated by the particular joint design.

Once the layup 8 has been locked into position by the enlarged pinheads 13, the conjoined components 1, 4, are subjected to heat and pressure, here using an autoclave, whereby to cure the resin matrix of the pre-preg layup and bond the two components together.

It will be appreciated that the deformed shape of the pins 2, as shown in FIG. 5, will prevent peel loads applied to the joint from peeling the composite material away from the metallic component.

The arrangement of FIGS. 2 to 5 is suitable for a large maritime joint. Here, 2.5 mm mild steel sharp tipped conical pins 2 having deformable tips for pressure forming of caps are added to metallic end tabs 1 for welding to a ship's primary superstructure. A glass fibre textile layup 8 is laid up on top of the pins 2. An intensifier is placed on top of the layup and pressure is applied by a vacuum bag (not shown) used for infusing the joints. The joints are infused and cured under pressure in accordance with the requirements of the composite material. Pressure is then applied to the protruding pin heads 9 such that they are deformed into flat caps 13 that constrain movement of the composite component 4.

Figure 6:
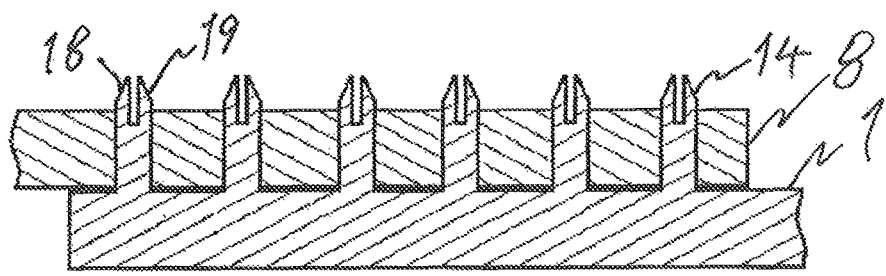
FIGS. 6, 8 and 9 show, in section, how the process of the invention is applied to a first alternative pin design.
Figure 7:
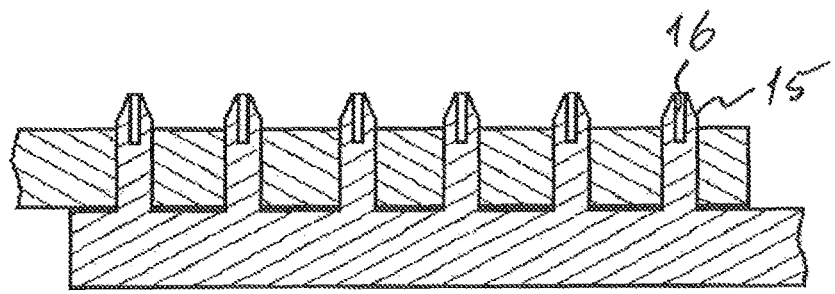
FIGS. 7 and 10 show, in section, how the process of the invention is applied to a second alternative pin design.
Figure 8:
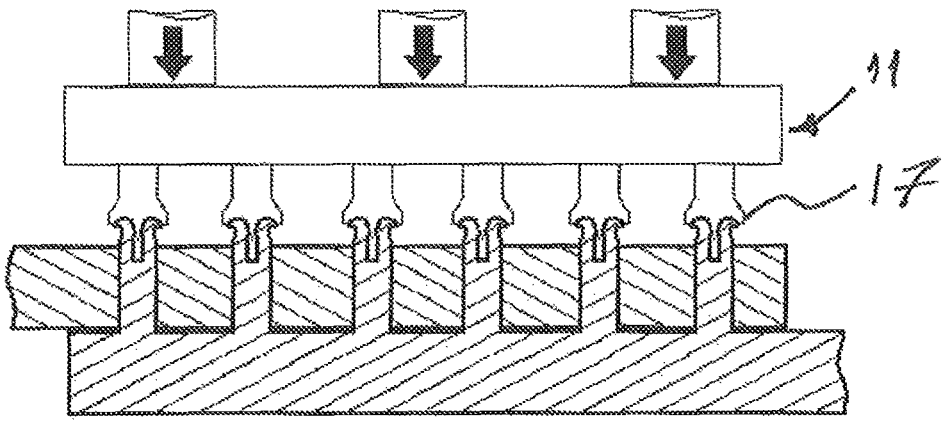
Figure 9:
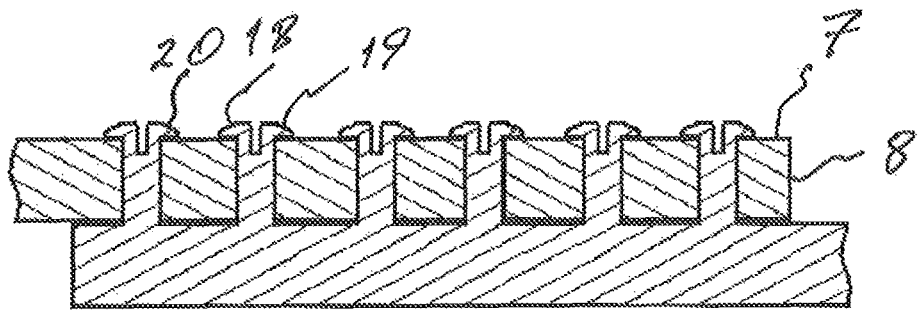
Figure 10:
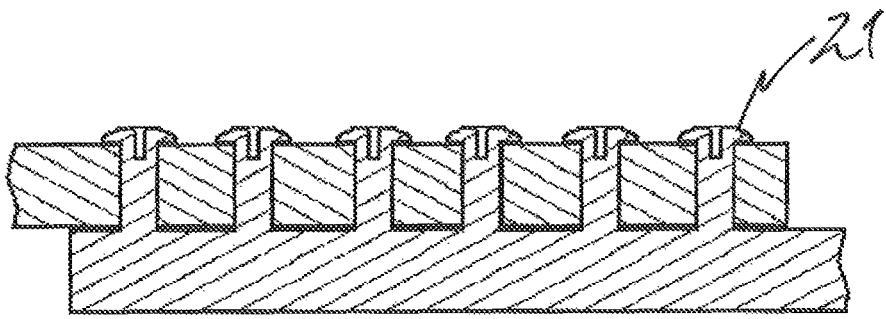

Referring to FIGS. 6, 7, 8, 9 and 10, FIGS. 6, 8 and 9 show a pin deforming process applied to one form of pin head and FIGS. 7, 8 and 10 show a similar deforming process applied to an alternative form of pin head. FIG. 6 shows an assembly of metallic component 1 and layup 8, as previously. Here, the pins 2 have tapered bifurcated heads 14. In contrast, the pins of FIG. 7 have frusto conical heads 15 penetrated by cylindrical bores 16.

The press 11 has shaped forming heads 17 which, for the FIG. 6 embodiment, are shaped to spread forks 18, 19 of the bifurcated head 14 into the shape shown in FIG. 9 in which the forks 18, 19 are swaged over the upper surface 7 of the layup 8. For the FIG. 7 embodiment, the forming heads 17 of the press are shaped to engage each pin within the bore 16 and to swage a tip portion 20 thereof outwardly until it achieves the circular enlarged shape 21 shown in FIG. 10.

The arrangement of FIGS. 6, 8 and 9 can be used for a medium sized automotive joint. Here, 1.5 mm aluminium sharp tipped conical pins 2 with a slit in a bifurcated head facilitating a head-splitting process are added to a metallic component 1 in the form of an aluminium subframe extrusion connector. A glass fibre textile layup 8 is pressed over the top of the pins as part of a composite chassis construction process. A head-splitting process is performed on the pins 2 to constrain the textile layup 8. The joint is infused/cured in accordance with the schedule specified for the type of composite material used.

Figure 11:
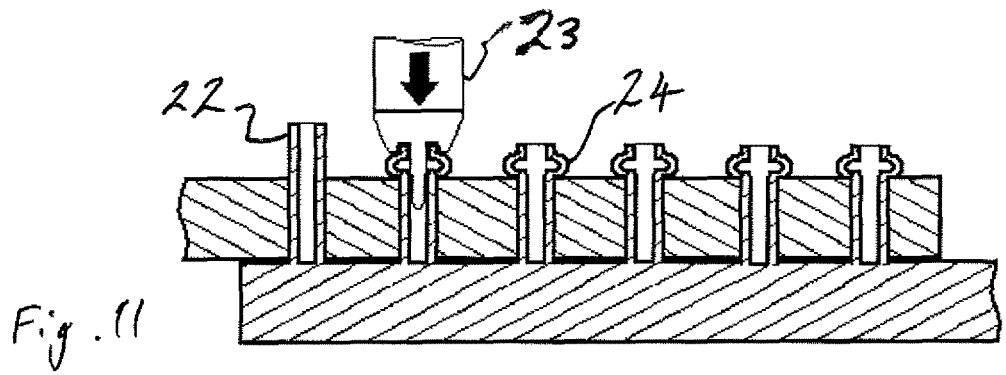
FIG. 11 shows, in section, two stages of an example construction according to the invention having hollow pins compressed by a tool to form constraints.

FIG. 11 shows a construction according to the invention in which the metallic component 1 has hollow pins 22. These are axially compressed by a tool 23 to form a constraint in the form of an enlarged head 24.

Figure 12:
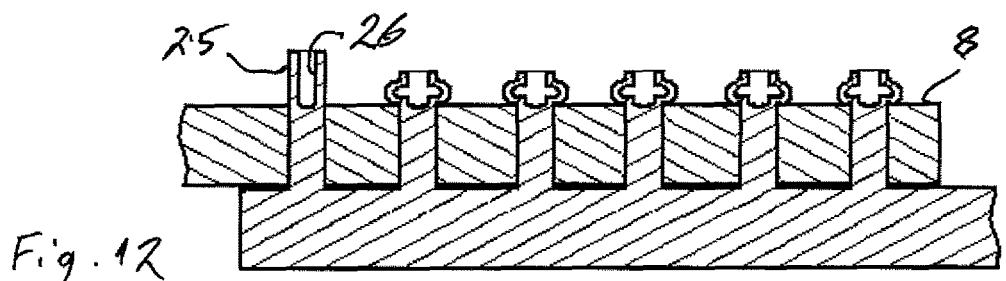
FIGS. 12 and 13 show variations of the pin section shown in FIG. 11.

FIG. 12 shows a similar arrangement to FIG. 11 but with pins 25 which are only hollow for a portion 26 which extends clear of the layup 8. Such an arrangement will be stronger, and less susceptible to damage for particular pin attachment methods than the type shown in FIG. 11.

Figure 13:
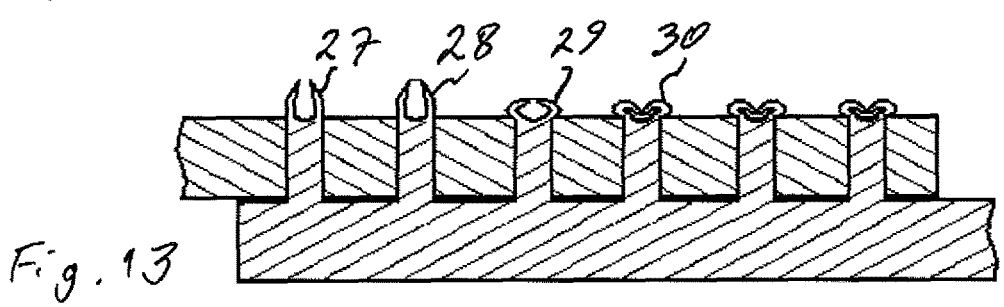
Figure 14:
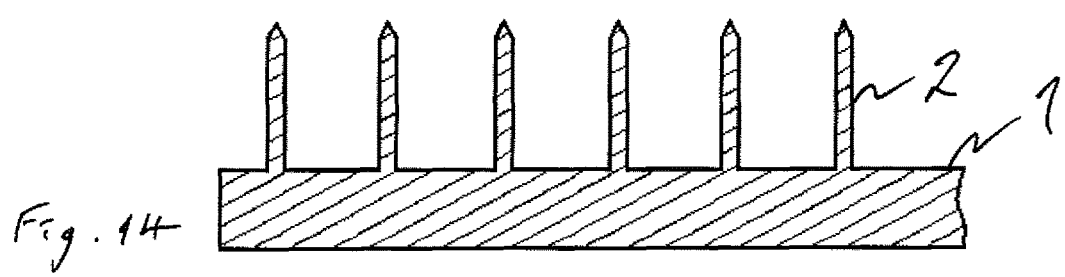
FIG. 14 shows, in section, a metallic component having pins with conical formed pin heads, for use according to the invention.

FIG. 13 shows an arrangement similar to those of FIGS. 11 and 12 having alternative forms of pin 27, 28. Pin 27 is bifurcated while pin 28 is tapered and hollow. In each case, axial compression of the pin with a flat or domed tool (not shown) will result in an enlarged head, either bifurcated 29 or circular 30.

Figure 15:
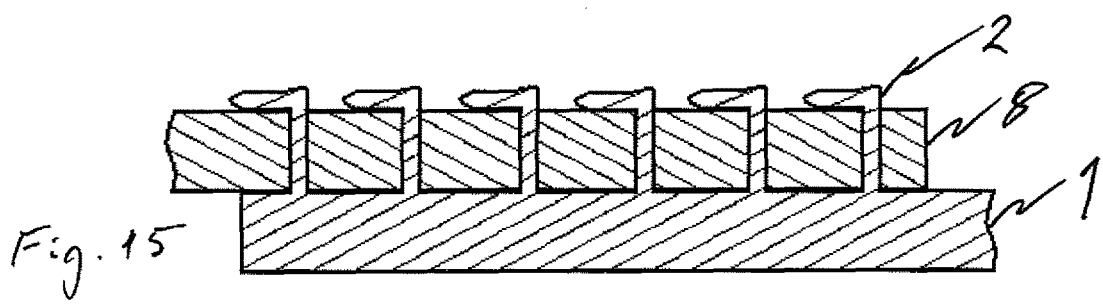
FIG. 15 shows the component of FIG. 14 engaged with a composite component with the pins bent over to form constraints.
Figure 16:
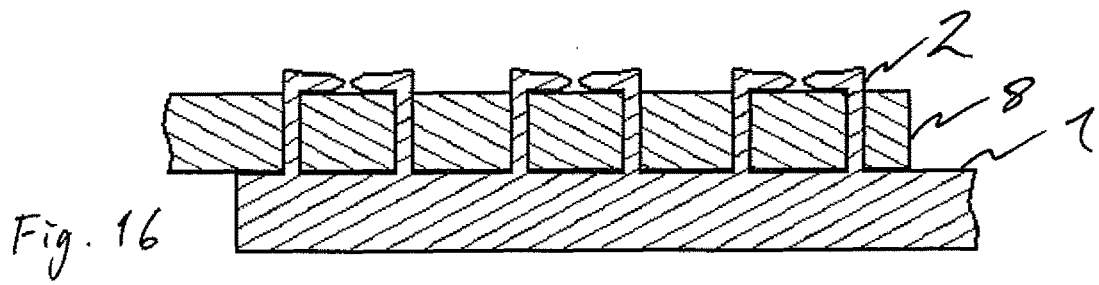
FIG. 16 shows an arrangement similar to that of FIG. 15 with the pins bent over in an alternative configuration.

FIGS. 15 and 16 show alternative arrangements for simply bending over pins 2 of a metallic component 1 to form constraints for joined components 1, 4.

Figure 17:
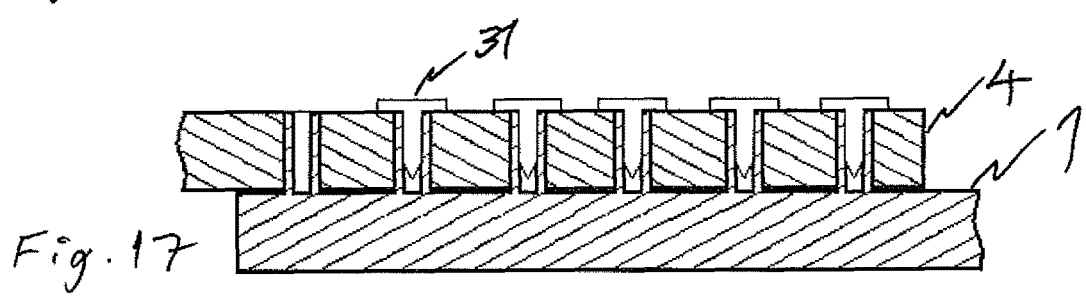
FIGS. 17, 18 and 19 show, in section, a metallic component joined to a composite component, according to the invention, in which hollow pins of the metallic component are engaged internally by alternative forms of constraint.
Figure 18:
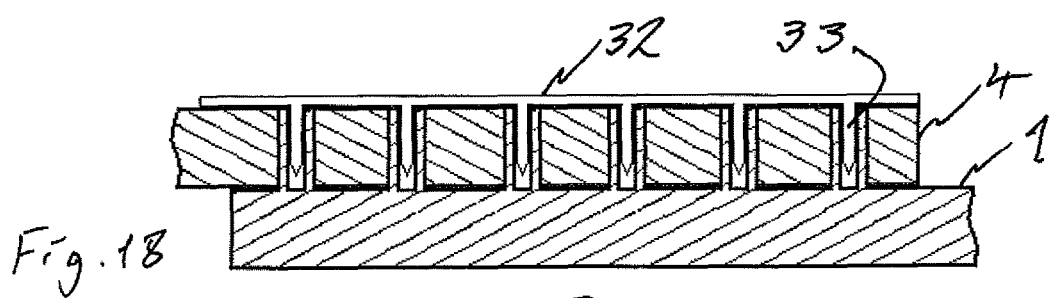
Figure 19:
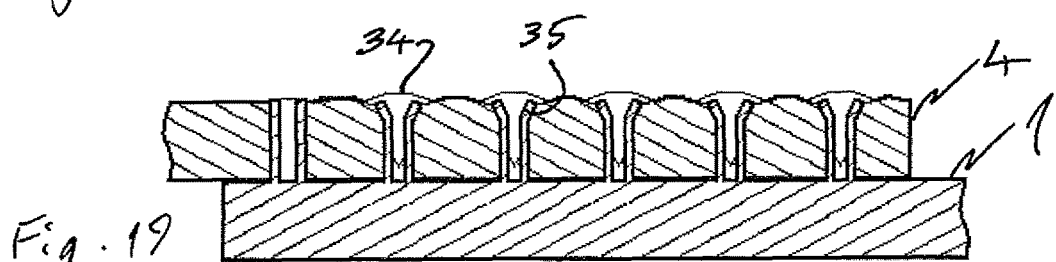

FIGS. 17, 18 and 19 show a metallic component 1 joined to a composite component 4, according to the invention, in which hollow pins 22 of the metallic component 1 are engaged internally by alternative forms of constraint. In FIG. 17, the constraints are formed by large headed pin inserts 31 which can be adhered and/or held in place with an interference fit. The inserts 31 could be metallic or another material such as plastics or ceramics.

FIG. 18 shows an extended constraint in the form of a sheet or strip 32 defining pins 33 therefrom. The pins 33 may be held in place by either or both of the methods described in relation to FIG. 17. Once again, the sheet or strip may be metallic or some other material.

In FIG. 19, pin inserts 34 are domed and have enlarged shoulders 35 to force open the hollow pins 22, upon full insertion therein. Such an arrangement will add to the constraining effect of the pins 22 and pin inserts 34 upon the composite 4.

Figure 20:
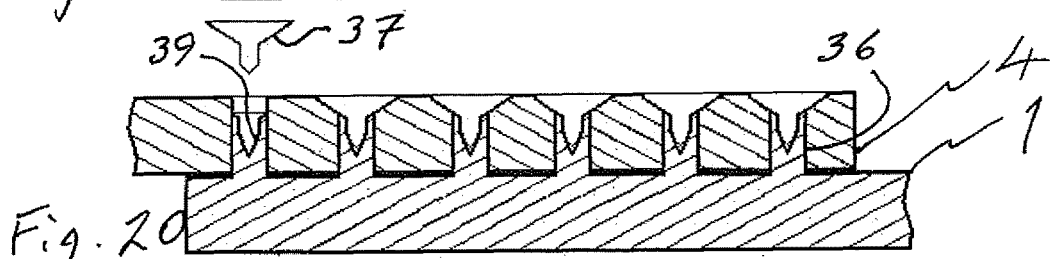
FIG. 20 shows, in section, a metallic component joined to a composite component, according to the invention, in which internally tapered hollow pins of the metallic component are engaged internally by constraints engaged with the internal tapers.

FIG. 20 shows a metallic component joined to a composite component in which internally tapered hollow pins 36 of the metallic component 1 are engaged on an internal taper 39 by constraints in the form of tapered pin inserts 37 engaged with the internal tapers. The tapered pin inserts 37 may be adhered in place and/or an interference fit, as described in relation to previous arrangements.

Figure 21:
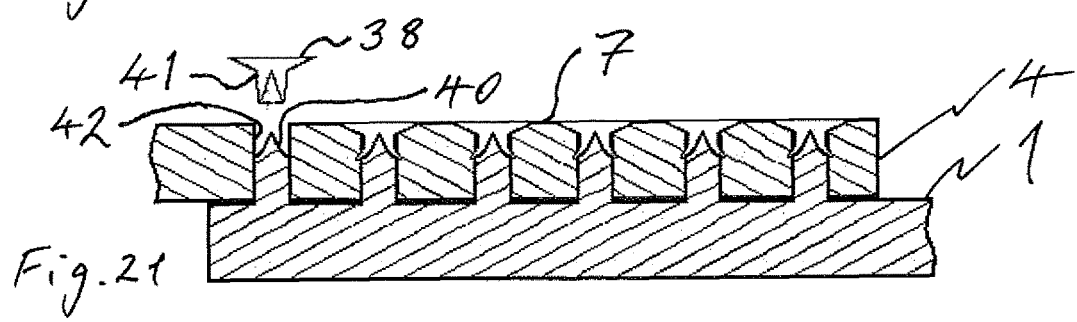
FIG. 21 shows, in section, a metallic component joined to a composite component, according to the invention, in which constraints in the form of hollowed out caps are engaged with shaped pin heads of the metallic component.

FIG. 21 shows constraints in the form of hollowed out caps 38 which fit over and may be engaged by adherence or otherwise with shaped pin heads 40 of the metallic component 1. It can be seen that a shaped underside 41 of each cap 38 engages both the upper surface 7 of the composite component 4 and also a bore 42 defined in the component 4. The cap 38 may be an interference fit in the bore 42 and/or adhered thereto.

Figure 22:
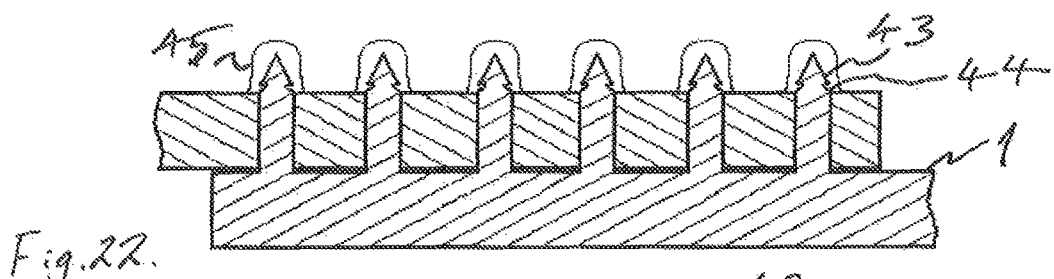
FIG. 22 shows an arrangement similar to FIG. 21 in which the pin heads are undercut and the caps are snapped or formed into place thereon.

FIG. 22 shows an arrangement with some similarity to that of FIG. 21 in which the pin heads 43 are undercut at 44 and the caps 45 are snapped or formed into place thereon by swaging or the like. The caps 45 can be metallic or some other suitable material which may have elastic properties to enable the snapping into place. Such a design may be suitable where processes to deform the pin heads are undesirable, where the strength of solid pins is required and thus engagement of a separate cap internally of the pin is not possible.

FIGS. 23, 24 and 25 each show a metallic component 1 joined to a composite component 4 in which a metal mesh 46 or other form of covering is layed on the upper surface 7 of the composite component, in engagement with pins of alternative form, to form a constraint. In FIG. 23, the pins 2 have arrowhead shaped heads 47 under which the mesh 46 is trapped, to enhance the constraint of the composite component 4. Such an arrangement is suitable for a small sized aerospace joint using, for example, 1 mm diameter titanium sharp tipped conical head pins 2 added to the joining interface 5 of a titanium landing gear component 1. Layers of carbon fibre textile 8 are pressed over the pins, thus integrating the metallic fitting with a composite airframe structure. A metal mesh retaining feature 46 is pressed into place on the landing gear component such that the mesh interferes with the undercut geometry of the conical arrow head. The metal mesh 46 may be multi-functional, e.g. used as part of a hybrid joint damage detection scheme. The joint is cured in accordance with the schedule specified for the type of composite material used.

In FIG. 24, the pins 2 are smooth sided. However, the metallic mesh 46, particularly if pierced by the pins 2 to allow penetration therethrough, will bite into or otherwise interfere with the surface of the pins to enhance the constraint of the composite component 4.

In FIG. 25, the pins 48 have both an arrowhead shaped head 47, as in FIG. 23, and a circumferential ridge 49 further to retain the composite component 4 in position.

FIGS. 26 and 27 show the pins 50, 51 being alternatively shaped, respectively, to receive deformable pin heads 52, 53. The pin heads are shaped to aid engagement of the composite material onto the pins, initially, and are of deformable material whereby to be deformed into an enlarge shape in a manner similar to that shown in FIGS. 4 and 5. Such an arrangement is of use where the pins themselves need to be made of a different material from that of the pin heads, for example of a stronger or stiffer material than the pin heads. Once again, the pin heads 52, 53 may be an interference fit and/or adhered into position. Soldering, brazing or some other form of molten metal joining process is also a possibility for securing the pins to their heads.

Alternatively, these pin caps may be temporarily attached to the pins in order to aid penetration of the pins through the fabric. Once the fabric is fully engaged over the pins, the caps may be pulled or snapped off or otherwise deformed and another form of constraint applied to each pin, according to the invention. This approach is particularly advantageous when lower cost or bulbous pin designs would hamper the assembly of composite fabric to metallic component. Additionally the pin caps may be designed for repeated re-use.

The invention claimed is:

1. A method of forming a joint between a fibre reinforced composite component and a metallic component, the metallic component and the composite component each defining a joint surface for mating with the joint surface of the other to join the two components together and the composite component defining a free surface opposed to the joint surface thereof, the joint surface of the metallic component defining an array of pins extending therefrom with each pin defining a pin head at an end distal from the joint surface, the method including:
   pressing together the joint surfaces of the two components whereby to cause the array of pins to penetrate the fibre reinforced composite component; and
   modifying the effective cross sectional shape of the pin heads whereby to increase a constraint applied to the composite component against peeling of the composite component from the joint surface of the metallic component,
   wherein modifying the effective cross sectional shape of the pin heads comprises attaching a retaining feature to the pins, the retaining feature being shaped to engage the composite component to prevent withdrawal of the pins therefrom, and
   wherein the method further includes forming the pins so as not to fully penetrate the composite component, upon assembly, and forming the pin heads with one of an internal and an external taper and forming the retaining feature with the other of the internal and external taper whereby, upon assembly of the metallic component and composite component together, axial engagement of the pins with the retaining feature will occur and the tapers will force one of the pin head and the retaining feature to expand radially of the pin and interfere with the composite component.

2. The method as in claim 1, further including adhering the retaining feature to the pins.

3. The method as in claim 1, further including forming the pins and the retaining feature whereby, upon assembling the metallic component and composite component together, an interference fit will occur between the pins and the retaining feature.

4. The method as in claim 1, wherein the retaining feature is metallic, and wherein the method further includes welding the retaining feature to each pin head after assembly of the metallic component and composite component together.

5. The method as in claim 1, further including forming the pins with a hollow to receive the retaining feature therein and forming each retaining feature with at least one protrusion to engage at least one pin in the hollow thereof.

6. The method as in claim 1, further including forming the retaining feature with an external taper shaped to compress an area of the composite component surrounding an aperture formed therein by passage of the pin therethrough, upon assembly of the metallic component and composite component together.

7. The method as in claim 1, wherein increasing the constraint applied to the composite component applies a residual compressive stress to the composite component.

8. The method as in claim 1, wherein the composite component comprises a layup of fibre plies which is interspersed with a plastics matrix material and wherein, subsequent to carrying out the method, the layup is cured.

9. A method of forming a joint between a fibre reinforced composite component and a metallic component, the metallic component and the composite component each defining a joint surface for mating with the joint surface of the other to join the two components together and the composite component defining a free surface opposed to the joint surface thereof, the joint surface of the metallic component defining an array of pins extending therefrom with each pin defining a pin head at an end distal from the joint surface, the method including:
pressing together the joint surfaces of the two components whereby to cause the array of pins to penetrate the fibre reinforced composite component;
modifying the effective cross sectional shape of the pin heads whereby to increase a constraint applied to the composite component against peeling of the composite component from the joint surface of the metallic component; and
forming the pins and retaining feature whereby, upon assembling the metallic component and composite component together, an interference fit will occur between the pins and retaining feature,
wherein modifying the effective cross sectional shape of the pin heads comprises attaching a retaining feature to the pins, the retaining feature being shaped to engage the composite component to prevent withdrawal of the pins therefrom, and
wherein the retaining feature comprises at least one of a metallic mesh and a covering layer, and the method further includes forming the pins with pointed pin heads and forcing the pins through at least one of the metallic mesh and the covering layer, upon assembly of the metallic component to the composite component, whereby to cause the said interference fit to occur.

10. The method as in claim 9, wherein the pin heads are formed as arrowheads and wherein at least one of the metallic mesh and the covering layer is caused to pass into interlocking engagement with the pins behind the arrowheads, upon assembly of the metallic component and composite component together.

11. The method as in claim 9, further including adhering the retaining feature to the pins.

12. The method as in claim 9, wherein the retaining feature is metallic, and wherein the method further includes welding the retaining feature to each pin head after assembly of the metallic component and composite component together.

13. The method as in claim 9, further including forming the pins with a hollow to receive the retaining feature therein and forming each retaining feature with at least one protrusion to engage at least one pin in the hollow thereof.

14. The method as in claim 9, further including forming the retaining feature with an external taper shaped to compress an area of the composite component surrounding an aperture formed therein by passage of the pin therethrough, upon assembly of the metallic component and composite component together.

15. A method of forming a joint between a fibre reinforced composite component and a metallic component, the metallic component and the composite component each defining a joint surface for mating with the joint surface of the other to join the two components together and the composite component defining a free surface opposed to the joint surface thereof, the joint surface of the metallic component defining an array of pins extending therefrom with each pin defining a pin head at an end distal from the joint surface, the method including:
pressing together the joint surfaces of the two components whereby to cause the array of pins to penetrate the fibre reinforced composite component; and
modifying the effective cross sectional shape of the pin heads whereby to increase a constraint applied to the composite component against peeling of the composite component from the joint surface of the metallic component,
wherein modifying the effective cross sectional shape of the pin heads comprises attaching a retaining feature to the pins, the retaining feature being shaped to engage the composite component to prevent withdrawal of the pins therefrom, and
wherein the method further includes fitting the pins with temporary shaped pin head attachments to aid assembly of the metallic component to the composite component and removing the pin head attachments after the assembly and prior to fitting the retaining feature to the pins.

16. The method as in claim 15, further including adhering the retaining feature to the pins.

17. The method as in claim 15, further including forming the pins and the retaining feature whereby, upon assembling the metallic component and composite component together, an interference fit will occur between the pins and the retaining feature.

18. The method as in claim 15, wherein the retaining feature is metallic, and wherein the method further includes welding the retaining feature to each pin head after assembly of the metallic component and composite component together.

19. The method as in claim 15, further including forming the pins with a hollow to receive the retaining feature therein and forming each retaining feature with at least one protrusion to engage at least one pin in the hollow thereof.

20. The method as in claim 15, further including forming the retaining feature with an external taper shaped to compress an area of the composite component surrounding an aperture formed therein by passage of the pin therethrough, upon assembly of the metallic component and composite component together.

* * * * *